Figure 1:
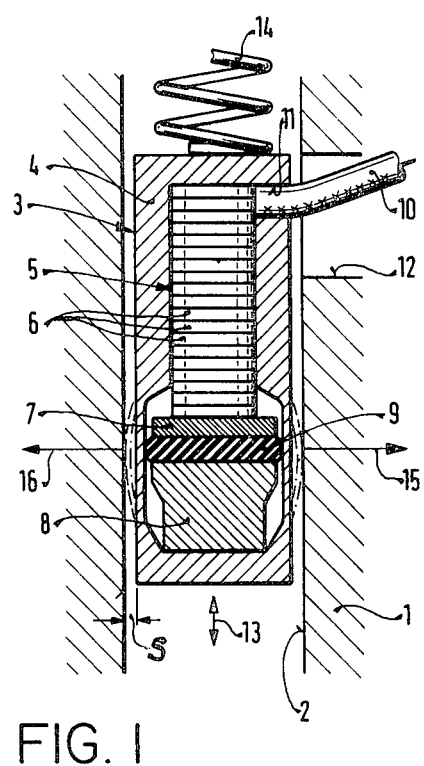
Figure 2:
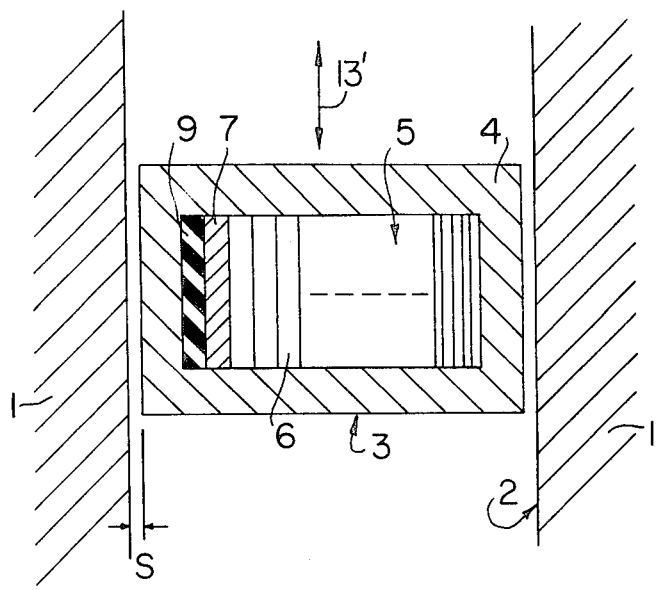

United States Patent [19]

Babitzka et al.

[11] 4,438,363
[45] Mar. 20, 1984

[54] ELECTRICALLY CONTROLLED MECHANICAL POSITIONING DEVICE

[75] Inventors: Rudolf Babitzka, Kirchberg; Ernst Linder, Mühlacker, both of Fed. Rep. of Germany

[73] Assignee: Robert Bosch GmbH, Stuttgart, Fed. Rep. of Germany

[21] Appl. No.: 311,677

[22] Filed: Oct. 15, 1981

[30] Foreign Application Priority Data

Oct. 23, 1980 [DE] Fed. Rep. of Germany ....... 3039973

[51] Int. Cl.³ ...................... H04R 17/00; H01L 41/08
[52] U.S. Cl. ..................................... 310/328; 310/332
[58] Field of Search ............... 310/325, 328, 330, 331, 310/332

[56] References Cited

U.S. PATENT DOCUMENTS

| 2,587,482 | 2/1952 | Keller | 310/328 X |
| 3,598,506 | 8/1971 | O'Neill | 310/328 X |
| 3,608,409 | 9/1971 | Schmidt | 310/328 X |
| 3,766,415 | 10/1973 | Dame et al. | 310/328 |
| 3,903,435 | 9/1975 | Bouygues et al. | 310/328 |
| 4,113,387 | 9/1978 | Shutt | 310/332 X |
| 4,219,755 | 8/1980 | O'Neill et al. | 310/348 |

FOREIGN PATENT DOCUMENTS

1248224 9/1971 United Kingdom .
1320057 6/1973 United Kingdom .

*Primary Examiner*—Peter S. Wong
*Attorney, Agent, or Firm*—Frishauf, Holtz, Goodman & Woodward

[57] ABSTRACT

To provide for extremely fast response of positioning of a positioned element (3) operating within a guide bore (2) formed in a housing (1), upon application of a force, for example by loading of a spring (14), the element (3) is a hollow body (4) within which a stack assembly (5) of piezoelectric disks (6) is located, the piezoelectric disks expanding or contracting under application of electrical energy from a cable (11) against an elastomer disk or cushion (9) which, consequently, will elastically expand the side walls of the body (4) to clamp the element (3) in the guide bore (2) and permit release, for example, at time of maximum applied force to result in abrupt, sudden high operating force and acceleration of the positioned element. Positioning times of between 10 to 100 microseconds can be obtained.

13 Claims, 1 Drawing Figure

ELECTRICALLY CONTROLLED MECHANICAL POSITIONING DEVICE

Cross reference to related applications, assigned to the assigne of the present application:

U.S. Ser. No. 274,526, filed June 17, 1981, BABITZKA et al. now U.S. Pat. No. 4,382,243.

U.S. Ser. No. 311,678, filed Oct. 15, 1981, BABITZKA et al.

U.S. Ser. No. 311,676, filed Oct. 15, 1981, BABITZKA et al., now U.S. Pat. No. 4,388,908.

The present invention relates to an electrically operated mechanical positioning element, and more particularly to a positioning element which can be subjected to an external force, and which, when electrically controlled, can prevent movement thereof event though the force is applied.

BACKGROUND

Various types of positioning elements are used, frequently by being controlled by mechanical drive arrangements, such as cams or the like, and often with springs interposed therebetween. Pneumatic, hydraulic, or electromagnetic drives may also be used. The positioning forces usually build up to a maximum force. As a consequence, the positioning element is subjected to a gradually increasing force and acceleration of the positioning element itself will be a function of the—gradually increasing—applied force. Extremely short positioning times, for example in the microsecond range, thus cannot be obtained with such positioning elements.

Piezoelectric elements have extremely short reaction times; they can switch states from between 10 to 100 microseconds (see, for example German Patent Disclosure Document DE-OS 20 28 442 to which British Patent No. 1,320,570 corresponds). The positioning distance of such elements, however, is extremely small—restricted to small fractions of a millimeter, thus severly limiting the application of piezoelectric elements for positioning components or devices to which they may be coupled.

THE INVENTION

It is an object to provide a positioning device which can have substantial positioning travel and yet is capable of operating at an extremely fast rate by being subjected, suddenly, to a high positioning force.

Briefly, a plurality of piezoelectric disks are stacked together to form a stack assembly or column of disks. The column of disks is retained within a guide-way. In dependence on electrical control of the disks, they will expand or contract. Expansive movement of the disks is transferred to the walls of the guide-way to clamp the element in position within the guide-way. External force, for example by a compressing spring, hydraulic or pneumatic force or the like, can then be applied to the element in the guide-way. In spite of the application of force, it remains securely clamped therein. Upon change of state of the electrical power applied to the piezoelectric stack assembly or column, the device can be caused to contract, thus releasing the stack from clamped holding within the guide-way and permitting it to move therein, under the full power of the applied external force. The timing of the release can be synchronized with maximum applied force, so that rapid positioning of the device will occur.

The element has the advantage that extensive and substantial positioning distances or path lengths can be obtained, while still retaining the advantages of the extremely short reaction time of piezoelectric elements.

In accordance with a particularly advantageous feature of the invention, the stack of piezoelectric disks is arranged to act on a pressure plate which is clamped between the stack and a counter element or anvil, the pressure plate being elastic, for example a rubber or another elastomer disk, which, directly or indirectly, can expand to engage the walls of the guide-way.

DRAWING

The single FIGURE is a highly schematic longitudinal section through a positioning element, from which all components not necessary for an understanding of the invention have been omitted, or shown only by graphic representation.

A housing 1 has a guide bore or channel 2 formed therein, within which the positioning element 3 is located. The positioning element 3 includes a body 4 which has an internal opening within which a stack or column 5 of piezoelectric disks 6 is located. Column 5, at one end, is fitted against the bottom of the opening in the body 4; the other end of the stack 5 is connected to a plate 7. The opening within the body 4 is closed off at the bottom end, for example by being welded to the body 4, screwed thereon, or otherwise connected—not shown in the drawing—and a counter element or anvil 8 is fitted therein. The body 4, also, can be opened laterally to permit assembly of the components therein.

A rubber disk 9 in form of a rubber cushion or pillow is placed between the plate 7 and the anvil 8. The side wall of the hollow body 4 is reduced in thickness in the region of the rubber cushion 9 to permit expansion of the side walls, as shown in chain-dotted lines in the FIGURE. A cable 10 is carried through a radial bore 11 formed in the body 4, the cable 10 being carried through the housing 1 through a lateral opening 12. The lateral opening 12, preferably, should be long enough to accomodate the longitudinal movement of the positioning element 3. The positioning element can move in the direction of the double arrow 13.

For purposes of illustration, and as an example, the positioning force applied to the positioning element 3 is generated by a compression spring 14; further drives, to which the spring 14 can be connected, for example a cam drive and the like, are not shown. Of course, the positioning element 3 can be moved by various force application means without changing its operation. If the travel of the positioning element 3 is to be long—as determined by external design diameters—the cable 10 can be replaced by sliding contacts, slip-bus bar connections or other similar electrical movable connection elements.

Operation: Let it be assumed that the operating voltage applied through cable 10 to the piezoelectric disk 6 of stack 5 is disconnected. The dimension of the wall portion opposite the rubber cushion 9 will be as shown in the solid-line representation. The rubber cushion 9 is slightly compressed between the anvil 8 and the plate 7, and provides some positioning pressure to the column 5. The edge of the rubber cushion 9 engages the inner surface of the chamber formed in the body 4 in the region of the rubber cushion, where the inner walls have been weakened or made thinner.

Upon energization, the disks 6 will expand axially, in effect, become thicker, while contracting in their diameter. Consequently, the stack assembly of the disks 6 will elongate, causing pressure to be applied from the pressure plate 7 on the rubber cushion 9. This pressure will extend in the direction of the arrows 15, 16 and will be transferred to the weakened wall portions of the body 4, causing the weakened wall portions to bulge outwardly as shown in chain-dotted lines in the drawing. The drawing, of course, shows this change in external dimension of the wall portions of body 4 in greatly exaggerated and enlarged dimension. The normal difference in the diameter of the body 4 and the inner wall of the bore 2 of the body 1, s, is thus bridged by the expansion of the weakened walls of the element 4, so that the element 4 will be securely clamped within the bore 2. Upon disconnection of operating voltage, the column 5 will again foreshorten to its normal dimension, and the rubber cushion 9 as well as the wall of the hollow body 4, resiliently, again assume their normal position as shown in full line in the drawing. This releases the element 3 for positioning movement along the guide-way 2.

A suitable use for the element 3 is obtained by connecting, for example, spring 14 to a cam which has a gradually increasing land. Before the land of the cam reaches the spring 14, and when the positioning element is in its rest or quiescent position, operating voltage is applied to the cable 10, thus clamping the body 4, and hence the element 3 within the guide-way 2. Rotation of the cam then will continue to compress spring 14. When the spring 14 has been stressed to a required positioning force, the operating voltage applied to the cable 10 is disconnected, thus suddenly releasing the positioning element 3 so that its positioning path will be traversed in form of a sudden impact in a very short interval.

The positioning element 3 can also be operated differently; for example, the housing 1 can be moved and the positioning element 3 is retained in a fixed position with respect to a reference. Housing 1 and positioning element 3 can be suddenly and abruptly coupled by energization of cable 10, and hence of the piezoelectric disks 6. The particular characteristics of the element 3 thus can effect coupling between the housing 1 and the element 3 in shorter time than heretofore possible.

Preferably, the disks 6 are connected, electrically, in parallel. The guide-way 2, and hence the body 4, may be of circular cross section, but they may have square or other form, for example open at one or two sides, to permit insertion of the stack 5, plate 7, anvil 8, and interposed rubber cushion 9, upon slight compression thereof, and subsequent release for self-seating due to the inherent elasticity of the cushion 9.

The FIGURE shows the stack having its axis in alignment with the direction of movement as shown by arrow 13; of course, the arrangement can be turned 90°, with the weakened wall portion of the element 4 being at the bottom thereof, so that the elastic element is constrained in axial direction, but the bottom can bear against the inner wall of the guide bore—now transverse to the longitudinal axis of the element 4. It does not matter, therefore, whether the expansion or bulging of the element 3 is lateral—as shown—or transverse.

The nature of the expansion and contraction of the disks—considering, for example, only the diametrical dimension—will depend on the polarization of the disks with respect to the applied voltage. Thus, for example, the disks can be so polarized that, when energized, they contract diametrically and expand axially. This would be the most usual and customary arrangement. It is, of course, equally possible to so polarize the disks that, upon energization, they expand diametrically and contract axially—which then provides for opposite operation with respect to energizing signals. The structure, therefore, provides a versatile positioning element which can be arranged in many different ways by utilizing the feature of extremely fast response of piezoelectric elements to clamp a positioned element in a guide-way, or guide bore, by electrically controlled expansion of the piezoelectric elements in a stack.

Various changes and modifications may be made within the scope of the inventive concept.

We claim:

1. Electrically controlled mechanical positioning device of
   a movable element (3) which is electrically controllable to, selectively, permit or inhibit movement under influence and control of an applied electrical signal, having
   a support (1);
   means (2) defining a guide-way in the support and guiding movement of the element,
   and comprising, in accordance with the invention, a plurality of piezoelectric disks (6) stacked adjacent each other to form a stack assembly (5) in columnar form located within said element (3);
   said element (3) having an elastically deformable portion;
   said guide-way (2) having walls surrounding and retaining said movable element (3), said piezoelectric disks being secured within said element and, in dependence on a characteristic of an electrical signal applied to said stack assembly, expanding axially, and applying a deforming force to the elastically deformable portion which, in turn, applies a clamping force against the walls of the guide-way and, upon change of characteristics of the electrical signal, releasing the deforming, and hence clamping force and permitting movement of the movable element (3) in the guide-way.

2. Device according to claim 1, wherein the stack assembly (5) of piezoelectric disks is located within the movable element approximately coaxial with the guide-way (2).

3. Device according to claim 1, wherein the stack (5) has a longitudinal axis which extends approximately transversely to the longitudinal axis of the guide-way.

4. Device according to claim 1, further comprising an elastic cushion (9) supported against an end disk of the stack assembly (5) and elastically retaining said stack assembly within the element (3).

5. Device according to claim 1, wherein the element (3) is a hollow body (4).

6. Device according to claim 5, wherein the elastically deformable portion of the hollow body (4) is a portion of reduced wall thickness, the piezoelectric stack assembly (5) applying expansive force to said reduced thickness wall portion for clamping said element within the guide-way.

7. Device according to claim 6, wherein the stack assembly (5), upon change in electrical characteristics of the electrical signal applied thereto changes the longitudinal dimension of the stack assembly in columnar form.

8. Device according to claim 1, wherein the piezoelectric disks (6) are so polarized that, upon connection of electrical energy thereto, the diameter of the disks will reduce, and the axial length increase.

9. Device according to claim 1, wherein the piezoelectric disks (6) are so polarized that, upon connection of electrical energy thereto, the diameter of the disks will expand and the axial dimension decrease.

10. Device according to claim 1, wherein the positioning element (3) comprises a hollow body (4), the stack assembly (5) of piezoelectric disks (6) being longitudinally positioned within the hollow body;

an anvil (8) positioned within the hollow body, opposite the end of the stack assembly;

and an elastic disk interposed between the anvil (8) and the stack assembly (5), the edges of the elastic disks bearing against the inner wall surfaces of the hollow body in the region of the elastically deformable portion, change of electrical characteristics of the signal applied to the piezoelectric disks causing, respectively, axial expansion and contraction of the piezoelectric disks, and hence bulging of the elastic disk and compressive, outwardly deflecting bulging force being applied to the walls of the hollow body opposite the elastic disk, or, respectively, cessation of bulging of the elastic cushion and release of the outwardly deflecting bulging force being applied to the walls of the hollow body.

11. Device according to claim 10, wherein the wall portions of the hollow body oppossiste the elastic cushion or disks are weakened with respect to the remainder thereof to permit resilient outward deflection under applied pressure derived from outward bulging of said elastic cushion or disks (9).

12. Device according to claim 1, wherein the cross section of the guide-way (2) is circular and the element has circular cross section.

13. Device according to claim 1, wherein the guide-way is a guide bore (2) formed in the support (1).

* * * * *